INVENTOR
SOL SHAPIRO
ATTORNEY

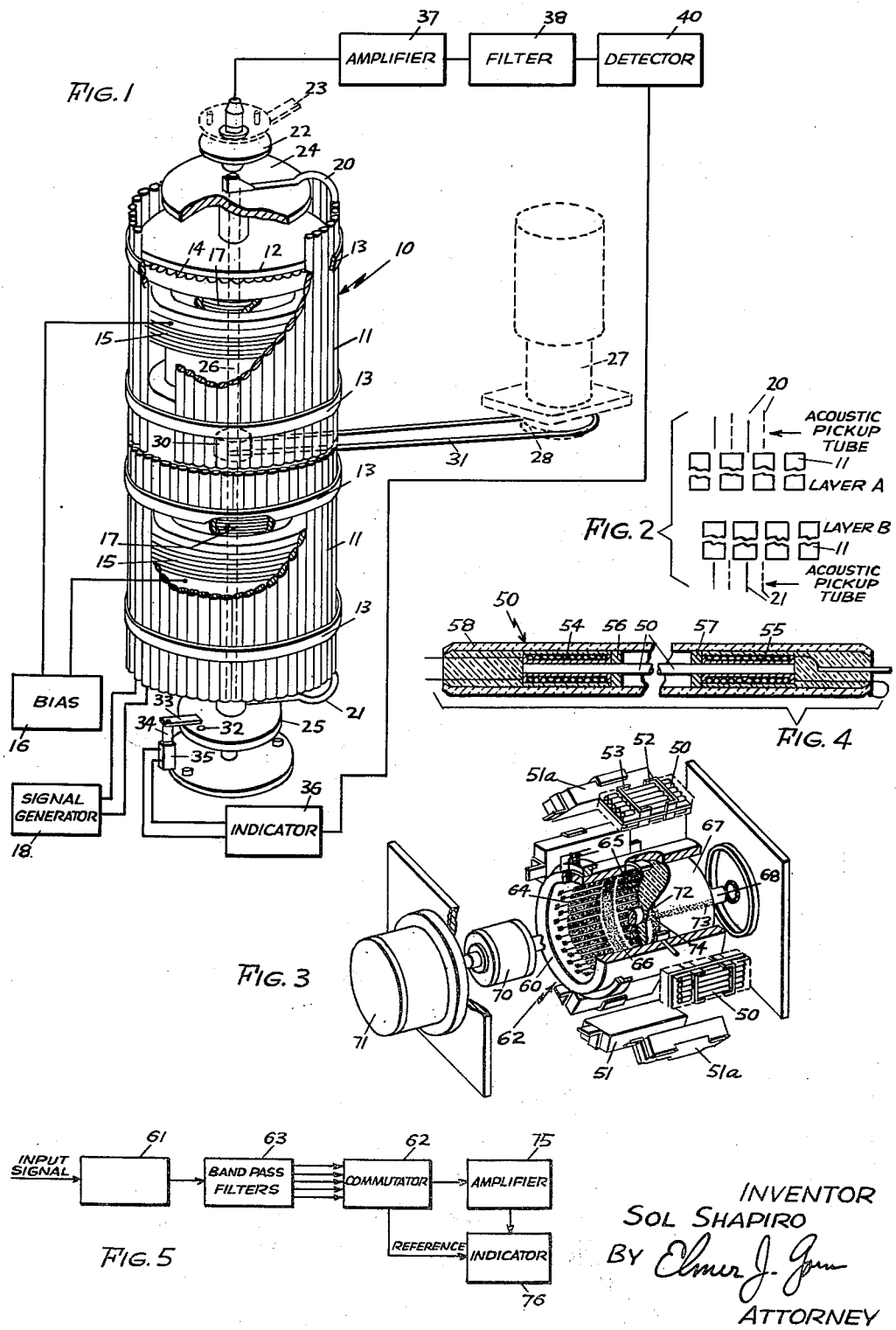

United States Patent Office 2,964,704
Patented Dec. 13, 1960

2,964,704

ELECTRICAL FREQUENCY ANALYZER AND COMMUTATOR THEREFOR

Sol Shapiro, Waltham, Mass., assignor to Raytheon Company, a corporation of Delaware Filed Feb. 28, 1955, Ser. No. 491,063

9 Claims. (Cl. 324—77)

This invention relates to commutators for alternating current signals and, more particularly, to such commutators as used in magnetostrictive analyzers.

Magnetostrictive frequency analyzers have been developed in which a signal to be analyzed is applied to a plurality of magnetostrictive rods, each resonant at a narrow band of frequencies within the range of frequencies of interest, and electrical acoustic, capacitive or photoelectric means used to obtain an electrical output proportional to the magnetostrictive displacement of each rod in turn. Heretofore, the outputs of the rods have been excited in the same fashion and sampled successively in a manner to produce currents that are in phase. The resulting signal has not given an indication having as great a resolution between closely spaced frequencies as might be desired.

By the present invention, this resolution is increased at some sacrifice of the amplitude of the output. This is accomplished by sensing the displacement of the rods in a manner to give voltages of opposing phase with the result that greater resolution between closely spaced frequencies is obtained.

Other objects and further advantages of this invention will be apparent as the description progresses, reference being had to the accompanying drawings wherein:

Fig. 1 is a diagrammatic view of one embodiment of the invention;

Fig. 2 is a diagrammatic representation of the sequence of scanning of the magnetostrictive elements of Fig. 1;

Fig. 3 is a diagrammatic view of an improved embodiment of the invention;

Fig. 4 is a longitudinal section through one of the magnetostrictive units;

Fig. 5 is a block diagram of a circuit incorporating the commutator of the invention;

Figure 6:
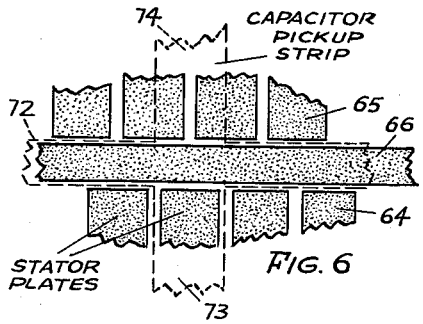
Fig. 6 is a diagrammatic representation of the sequence of scanning of the outputs of the magnetostrictive elements of the commutator of Fig. 3.

In Fig. 1, the reference numeral 10 designates generally the magnetostrictive filter assembly comprising a plurality of magnetostrictive rods 11 mounted about four discs 12 by means of bands 13 of elastic material that press the rods 11 against two pairs of spacers 14 of which only one is shown. These spacers are formed with triangular teeth and each is mounted on a respective disc 12. The rods 11 are arranged in two groups, with the axes of each member of one group centered between the axes of two adjacent members of the other group. A fixed magnetic biasing field is applied to both sets of rods 11 by means of coils 15 connected to a source 16 of fixed potential. One or more permanent magnets can be mounted within the arrays of magnetostrictive elements 11 to give this fixed magnetic biasing field in place of the coils 15. The signal to be analyzed is applied to all of the rods by means of coils 17 connected to a source 18 of signals that are to be analyzed as to frequency, such as the output of a CW or FM radar. Each rod is of such a length and is so mounted that it resonates preferably at the third harmonic of its fundamental resonant frequency. This harmonic is one of the exciting frequencies applied to the coil 17. The lengths of the rods 11 are selected, and they are arranged so that the resonant frequency of each rod in the lower group lies midway between the resonant frequencies of the two adjacent rods in the first group immediately above it. This arrangement is more clearly shown in diagrammatic form in Fig. 2 where corresponding parts are similarly numbered.

Compressional wave energy, or some waves created by the magnetostrictive displacement of the rods, is picked up from each rod, in turn, by sampling tubes 20 and 21, and applied to a microphone 22, preferably of the condenser type, supported by a bracket 23. The sampling tubes 20 and 21 are mounted on discs 24 and 25, respectively, attached to a shaft 26 driven by a motor 27 through pulleys 28 and 30, and a belt 31. A piece of magnetic material 32 is attached to the disc 25, also fastened to the shaft 26, so that it passes under the arm 33 of a permanent magnet 34 once every revolution to generate a synchronizing pulse in the coil 35 wound about the magnet. This pulse is applied to the deflection circuit that produces the base for the display on the face of a cathode ray tube indicator 36. The output of the microphones 22, after amplification in an amplifier 37, passes through a band pass filter 38 to a detector 40. The output of the detector 40 is applied to the vertical deflection circuits of the cathode ray tube 36. The displacement detection means may also be capacitive, or photoelectric. Other means than a cathode ray tube may be used as an indicator.

Another type of magnetostrictive frequency analyzer is shown in Figs. 3 through 5. In Fig. 3, the reference numeral 50 designates a plurality of magnetostrictive rods mounted in groups, each group on a mounting plate 51 and covered by a cover plate 51a, preferably of nonmagnetic material, by means of a pair of holding racks 52 and 53 mounted on the mounting plate 51. Each magnetostrictive rod 50, as shown in Fig. 4, has a pair of coils, one, 54, for applying the driving current and one, 55, for the output current generated by the expansion and contraction of the rod within the coil. Washers 56 and 57 are mounted at points where it is desired to locate the nodes when the rods are vibrating at the desired frequency. Each coil is supported by such a pair of washers 56 and 57 within a tube 58 of insulating material. Leads are brought out from the coils and, as with the magnetostrictive rods 11 of Fig. 1, a biasing magnetic force can be applied either by a coil or a permanent magnet. The mounting plates 51 with their groups of magnetostrictive rods 50 are mounted about the periphery of a hollow cylindrical support 60. The driving coils 54 of all the rods 50 are connected in series across a source 61 of signal (Fig. 5). The leads from the output coil 55 of each rod 50 are separately brought out to a commutator designated generally in Fig. 3 by the reference numeral 62. Each magnetostrictive rod and its associated coils act as a band pass filter for a narrow band of frequencies. These filters are designated in Fig. 5 by the reference numeral 63.

Figure 6A:
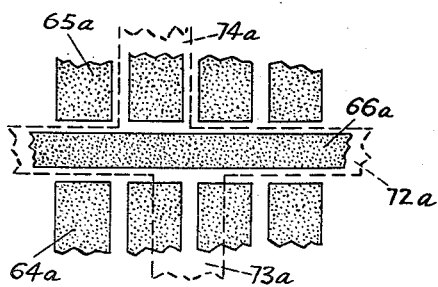
Fig. 6A is a diagrammatic representation of the sequence of scanning of the outputs of the magnetostrictive elements of a modification of the commutator of Fig. 3.

The commutator 62 comprises a plurality of conductive strips 64 and 65 of equal width (see Fig. 6), each extending axially along the inner surface of a support 60 and equally spaced about its circumference. The strips 64, 65 are arranged in two groups with the center lines of the strips of the first group 64 aligned with the spaces between adjacent strips 65 of the second group. The two groups are separated by a band 66 of conductive material. Strips 64 in the first group are respectively connected to rods 50 that are resonant at successively higher evenly spaced frequencies, and the strips 65 in the second group are respectively connected to rods 50 that are resonant at frequencies that are centrally located between the resonant frequencies of adjacent ones of the rods connected to the strips 64. One lead of each output coil 55 is connected to a reference potential. The second lead is connected to the associated strip 64 or 65. The output coils 55 connected to the strips 65 are connected in such polarity that the voltage applied to their associated strips are in phase opposition to the voltages applied to the strips 64 by their associated coils 55. A cylindrical rotor 67 (Fig. 3) is mounted for rotation within the cylindrical support 60 on a shaft 68 driven by the rotor 70 of a motor 71. The surface of the rotor 67 carries a centrally located conductive band 72 that is aligned with the band 66 on the inner wall of the support 60. Strips 73 and 74 of conductive material extend axially from a point on the band 72 at which they are electrically connected. The band 66 is connected to the input of an amplifier 75 (Fig. 5), the output of which is applied to one set of deflection plates in a cathode ray tube in an indicator 76. A synchronizing pulse generator (not shown) similar to that shown in Fig. 1, can be used to initiate the horizontal sweep of the cathode ray tube indicator 76. The proper relative phasing of the frequency components of the output can also be obtained (see Fig. 6A) by aligning the sets of strips 64a and 65a and offsetting the two strips 73a and 74a associated with the band 72a, so that they are out of line by half the width of a strip 64a or 65a as shown in Fig. 6A. With either arrangement the result is that capacitors are formed between the strips 64 and 65 on the one side, and strips 73 and 74 on the other, as shown in Figs. 6 and 6A.

Figure 7:
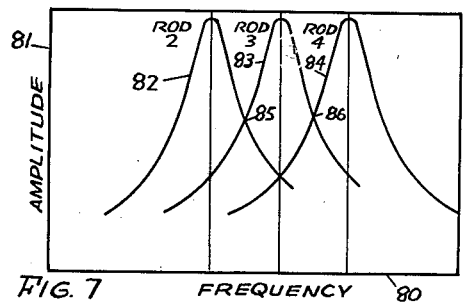
Fig. 7 is a frequency response diagram of the outputs of various rods.
Figure 9:
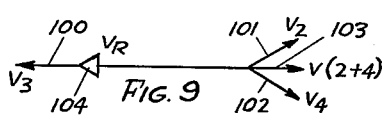
Fig. 9 is a vector diagram of the outputs of the various rods responding to the resonant frequency of one of these rods.
Figure 8:
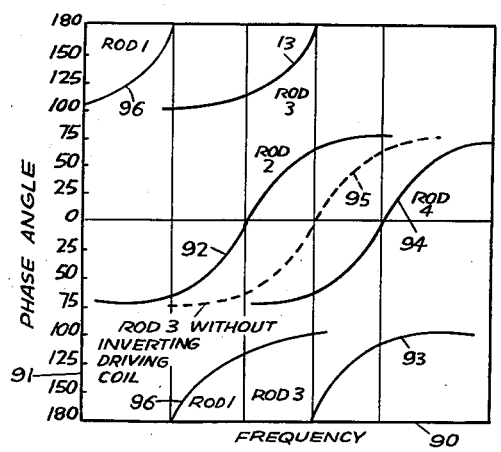
Fig. 8 is a phase angle diagram for the outputs of the various rods.

With the structure of either Figs. 1 or 3, the rods are adjusted so that their frequency response curves overlap at the half power points, as shown in Fig. 7, where the frequencies are plotted horizontally along line 80 and the relative amplitudes of the outputs are plotted vertically along the line 81. The curves 82, 83, and 84 represent the frequency responses of rods 2, 3 and 4, respectively. It will be noted that they overlap at the half power points 85 and 86. How the rods respond to a frequency lying between resonant frequencies of adjoining rods can best be seen by reference to the phase diagram of Fig. 8, where the frequency is plotted horizontally along the line 90, and phase angle relative to the fiducial angle obtaining at resonant frequency is plotted vertically along the line 91. The curves 96, 92, 93 and 94 represent the phase variation with frequency of rods 1, 2, 3 and 4, respectively. The dotted curve 95 is the phase variation of rod 3 without phase reversal. How the difference in phase affects the resultant output can best be seen in the vector diagrams of Figs. 9 and 10. The response of the rod 3 at its resonant frequency is represented by the vector 100. The response of the rods 2 and 4 are represented by the vectors 101 and 102. It will be noted that these vectors 101 and 102 are almost 180 degrees out of phase with the output of the rod 3 represented by the vector 100. The resultant of these two vectors 101 and 102 is represented by the vector 103. The resultant of the entire vector system is represented by the vector 104, which is in phase with the vector 100 and less in amplitude than this vector. If the output represented by vector 100 were not of this reversed phase, it would have been in phase with the vector 103, and the resultant vector 104 would have been of greater magnitude and in phase with vector 103.

Figure 10:
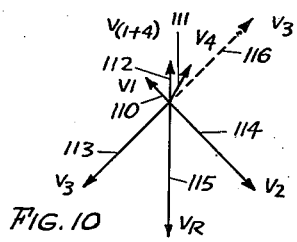
Fig. 10 is a vector diagram of the outputs of the various rods responding to a frequency midway between the resonant frequencies of two of the rods.
Figure 11:
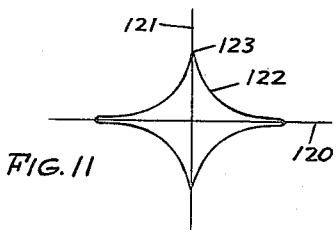
Figs. 11 and 12 show the increased resolution obtained with the arrangement of the invention.
Figure 12:
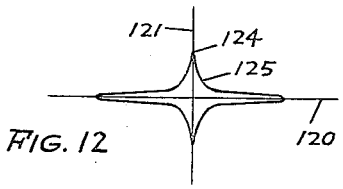

Fig. 10 shows the response to a vector lying between the resonant frequencies of rods 2 and 3. The output of rod 1 is represented by the vector 110. The output of rod 4 is represented by the vector 111. The resultant of the two is represented by the vector 112. The output of rod 3 is represented by the vector 113. The output of rod 2 is represented by the vector 114, and a resultant of all these outputs is represented by the vector 115. The dotted vector 116 represents the output of rod 3, if it were not out of phase with that of the even numbered rods. With in-phase phasing of the rods (as opposed to the alternate phase reversal of the present invention), the resultant output would be greater in amplitude when the signal contains a frequency component that is the resonant frequency of one of the rods, but also greater in amplitude than the output from an out-of-phase arrangement when the signal contains no such frequency component. This is seen in Figs. 11 and 12, where frequency is plotted horizontally along the line 120, and relative amplitude of output is plotted vertically along the line 121. The curve 122 in Fig. 11 is the envelope of the A.C. output of the analyzer with the in-phase arrangement. It will be seen that the maximum output reaches a peak 123 that is higher than the peak 124 for the curve 125 for the output of the analyzer using the out-of-phase arrangement of the invention. However, the curve 125 drops off much more sharply away from the peak than the curve 122. Thus, the arrangement of the invention can be seen to give greater definition between frequencies, which is more important in a frequency analyzer than the magnitude of the output.

This invention is not limited to the particular details of construction, materials and processes described, as many equivalents will suggest themselves to those skilled in the art. It is accordingly desired that the appended claims be given a broad interpretation commensurate with the scope of the invention within the art.

What is claimed is:

1. A frequency analyzer comprising a capacitive commutator having two sets of conductive stator plates, a movable conductive plate having sufficient area to cover portions of at least three stator plates, a plurality of filters each resonant at a different frequency and each one associated with a stator plate, said filters being arranged in two sets, means to apply a signal to one set of filters associated with one set of said plates in one phase and to the other set of such filters associated with a second set of said plates in the opposite phase.

2. A frequency analyzer comprising a capacitive commutator having two sets of rectangular conductive stator plates disposed about a cylindrical surface with the axes of plates of the first set aligned with the spaces between the plates of the second set, a movable conductive plate having sufficient area to cover portions of at least three stator plates, one from one set and two from the second set, said movable plate being formed in two parts aligned along the same axis, a plurality of filters each resonant at a different frequency and associated with a stator plate, said filters being arranged in two sets, means to apply a signal to one set of filters associated with one set of said plates in one phase and to the other set of such filters associated with a second set of said plates in the opposite phase.

3. A frequency analyzer comprising a capacitive commutator having two sets of rectangular conductive stator plates disposed about a cylindrical surface, a movable conductive plate having sufficient area to cover portions of at least three stator plates, said movable plate being formed in two parts, one associated with each set of stator plates and having their axes displaced by half the width of a stator plate, a plurality of filters each resonant at a different frequency and associated with a stator plate, said filters being arranged in two sets, means to apply a signal to one set of filters associated with one set of said plates in one phase and to the other set of such filters associated with a second set of said plates in the opposite phase.

4. A capacitive commutator comprising two sets of rectangular conductive stator plates disposed about a cylindrical surface with the axes of plates of the first set aligned with the spaces between the plates of the second set, a movable conductive plate having sufficient area to cover portions of at least three stator plates, one from one group and two from the second group formed in two parts aligned along the same axis and means to apply signals to said stator plates, the phase of said signals applied to one of said plates differing from the phase of signals applied to others of said stator plates.

5. A capacitive commutator comprising two sets of rectangular conductive stator plates disposed about a cylindrical surface, a movable conductive plate having sufficient area to cover portions of at least three stator plates, said movable plate being formed in two parts, one part associated with each set of stator plates, the axes of the two parts being displaced by half the width of a stator plate, and means to apply signals to said stator plates, the phase of said signals applied to one of said plates differing from the phase of signals applied to others of said stator plates.

6. A frequency-sensitive electrical device comprising at least three band-pass filter means the respective resonant frequencies of which are spaced apart in ordered relationship to provide overlapping frequency-response curves for each set of three frequency-adjacent filter means, means for applying an input signal to all of said filter means, means for deriving output signals of opposite phase from respective frequency-adjacent ones of said filter means, and output means for vectorially combining the output signals from at least three frequency-adjacent ones of said filter means.

7. An electrical frequency analyzer comprising a plurality of band-pass filter means the respective resonant frequencies of which are sequentially spaced apart in the frequency band to be analyzed to provide overlapping frequency-response curves for each set of three frequency-adjacent filter means, means for applying an input signal to all of said filter means, means for deriving output signals of a first phase from alternate ones of said filter means, means for deriving output signals from the remaining ones of said filter means in phase opposition to said first phase, output means, and commutator means interconnecting said output means and each of said means for deriving output signals to provide an analyzer output signal comprising the vectorial sum of the output of a selectable one of said alternate filter means and the outputs of the two filter means which are adjacent such selectable one in resonant frequency.

8. A commutator device comprising a plurality of relatively stationary commutator segment means arranged in a scanning sequence, means for applying an input signal to each of said commutator segments in phase opposition to the input signal applied to the commutator segment next thereto in such scanning sequence, means for deriving an output signal comprising a vectorial combination of the input signals applied to any three commutator segments adjacent in such scanning sequence, and means for effecting motion of said output deriving means relative to said commutator segments in such scanning sequence.

9. A capacitive commutator comprising a first group of conductive plates disposed in spaced-apart relationship about a first cylindrical surface, a second group of conductive plates disposed in spaced-apart relationship about a cylindrical surface coaxial with such first cylindrical surface, a relatively movable conductive plate mounted for rotational movement about a cylindrical surface coaxial with but radially spaced from said aforementioned cylindrical surfaces, said movable plate lying in at least partial registry with adjacent plates of either of said groups when said movable plate is in substantial registry with a single plate of the other group, means for applying input signals to the plates of said first group in a first phase, means for applying input signals to the plates of said second group in phase opposition to said first phase, and output means connected to said relatively movable plate to provide an output comprising a vectorial combination of the signals applied to the three plates with respect to which said movable plate is in at least partial registry at a given moment.

References Cited in the file of this patent

UNITED STATES PATENTS

| | | |
|---|---|---|
| 693,355 | Springer | Feb. 11, 1902 |
| 996,960 | Anderson | July 4, 1911 |
| 2,422,134 | Sanders | June 10, 1947 |
| 2,485,567 | Clark | Oct. 25, 1949 |
| 2,492,062 | Potter | Dec. 20, 1949 |
| 2,570,858 | Rajchman | Oct. 9, 1951 |
| 2,602,836 | Foster | July 8, 1952 |
| 2,648,822 | Walter | Aug. 11, 1953 |
| 2,774,035 | Richmond | Dec. 11, 1956 |